(12) United States Patent
Jeong et al.

(10) Patent No.: US 12,302,429 B2
(45) Date of Patent: May 13, 2025

(54) METHOD OF TRANSMITTING ACK SIGNAL IN WIRELESS COMMUNICATION SYSTEM AND ELECTRONIC DEVICE

(71) Applicant: SAMSUNG ELECTRONICS CO., LTD., Suwon-si (KR)

(72) Inventors: Minseop Jeong, Seoul (KR); Jinwook You, Hwaseong-si (KR); Myeongcheol Shin, Suwon-si (KR); Sangho Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 358 days.

(21) Appl. No.: 17/867,000

(22) Filed: Jul. 18, 2022

(65) Prior Publication Data

US 2023/0024463 A1    Jan. 26, 2023

(30) Foreign Application Priority Data

Jul. 22, 2021   (KR) .................. 10-2021-0096712
Apr. 20, 2022   (KR) .................. 10-2022-0049163

(51) Int. Cl.
*H04W 76/15*        (2018.01)
*H04L 5/00*         (2006.01)
*H04W 4/80*         (2018.01)

(52) U.S. Cl.
CPC .......... *H04W 76/15* (2018.02); *H04L 5/0053* (2013.01); *H04W 4/80* (2018.02)

(58) Field of Classification Search
CPC ........ H04W 76/15; H04W 4/80; H04L 5/0053
See application file for complete search history.

(56) References Cited

U.S. PATENT DOCUMENTS

| | | | |
|---|---|---|---|
| 8,660,055 B2 | 2/2014 | Ueda et al. | |
| 8,768,252 B2 * | 7/2014 | Watson ................... | H04R 3/00 455/3.06 |
| 9,973,556 B2 | 5/2018 | Baldwin et al. | |
| 10,206,039 B1 * | 2/2019 | Yun ......................... | H04R 3/12 |
| 10,244,307 B1 | 3/2019 | Tong et al. | |
| 10,728,941 B2 | 7/2020 | Batta et al. | |
| 10,848,549 B1 | 11/2020 | Rizvi et al. | |
| 10,917,774 B2 | 2/2021 | Huang et al. | |

(Continued)

*Primary Examiner* — Won Tae C Kim
(74) *Attorney, Agent, or Firm* — Sughrue Mion, PLLC (57) ABSTRACT

A method of transmitting an acknowledgement (ACK) signal in a wireless communication system is provided. The method includes: establishing a first wireless connection between a first and second electronic devices; establishing a second wireless connection between the first electronic device and a source device; transmitting, by the first electronic device, communication parameter information to the second electronic device; transmitting, by the first electronic device, a data request to the source device; receiving, by the first electronic device, a data packet from the source device in response to the data request; receiving, by the second electronic device, the data packet from the source device based on the communication parameter information; transmitting, by the first electronic device, a first ACK signal to the second electronic device; and transmitting, by the second electronic device, a second ACK signal to the source device based on the first ACK signal.

20 Claims, 8 Drawing Sheets

(56) References Cited

U.S. PATENT DOCUMENTS

| | | | |
|---|---|---|---|
| 10,959,011 B2 | 3/2021 | Koss et al. | |
| 2022/0141893 A1* | 5/2022 | Choi | H04W 4/80 370/329 |
| 2022/0312167 A1* | 9/2022 | Gong | H04W 4/80 |

* cited by examiner

METHOD OF TRANSMITTING ACK SIGNAL IN WIRELESS COMMUNICATION SYSTEM AND ELECTRONIC DEVICE

CROSS-REFERENCE TO RELATED APPLICATIONS

This application claims priority to Korean Patent Application Nos. 10-2021-0096712, filed on Jul. 22, 2021 and 10-2022-0049163, filed on Apr. 20, 2022, in the Korean Intellectual Property Office, the disclosures of which are incorporated by reference herein in their entireties.

BACKGROUND

The present disclosure relates to a method of transmitting a signal and an electronic device, and more particularly, to a wireless communication system transmitting an acknowledgement (ACK) signal.

With the development of digital technology, various types of electronic devices, such as a mobile communication terminal, a smartphone, a tablet, a personal computer (PC), a laptop computer, a personal digital assistant (PDA), a wearable device, and a digital camera are widely used.

An electronic device may communicate with an external electronic device through wired or wireless communication. The electronic device may control a wirelessly connected audio output device to play sound. For example, the electronic device may be wirelessly connected to the external electronic device (for example, a Bluetooth speaker, Bluetooth earbuds, or Bluetooth hands-free earphones) through Bluetooth communication to receive and/or provide an audio signal related to performance of a function of the electronic device through the external electronic device.

SUMMARY

One or more example embodiments relate to an operating method and an electronic device capable of preventing wireless signal processing from being concentrated on the same electronic device by separating an electronic device which establishes a connection with a source device from an electronic device which transmits an acknowledgement (ACK) signal.

According to an aspect of an example embodiment, a method of transmitting an ACK signal in a wireless communication system includes: establishing a first wireless connection between a first electronic device and a second electronic device; establishing, by the first electronic device, a second wireless connection between the first electronic device and a source device; transmitting, by the first electronic device, communication parameter information to the second electronic device; transmitting, by the first electronic device, a data request to the source device; receiving, by the first electronic device, a data packet from the source device in response to the data request; receiving, by the second electronic device, the data packet from the source device based on the communication parameter information; transmitting, by the first electronic device, a first ACK signal to the second electronic device; and transmitting, by the second electronic device, a second ACK signal to the source device based on the first ACK signal.

According to an aspect of an example embodiment, a method of operating an electronic device in a wireless communication system, includes: establishing a wireless session with another electronic device; receiving communication parameter information from the other electronic device through the wireless session; receiving a data packet transmitted from a source device to the other electronic device based on the communication parameter information; receiving a first ACK signal indicating the data packet is received by the other electronic device from the other electronic device; and transmitting a second ACK signal to the source device based on the first ACK signal.

According to an aspect of an example embodiment, a method of transmitting an ACK signal in a wireless communication system, includes: establishing a first wireless connection among a plurality of electronic devices; establishing a second wireless connection between a first electronic device among the plurality of electronic devices and a source device; transmitting, by the first electronic device, communication parameter information to remaining electronic devices except for the first electronic device among the plurality of electronic devices; transmitting, by the first electronic device, a data request to the source device; receiving, by the first electronic device, a data packet transmitted from the source device to the first electronic device based on the data request; receiving, by the remaining electronic devices, the data packet based on the communication parameter information; transmitting, by each of remaining electronic devices except for a second electronic device among the plurality of electronic devices, a first ACK signal to the second electronic device; and transmitting, by the second electronic device, a second ACK signal to the source device based on the first ACK signal.

According to an aspect of an example embodiment, an electronic system includes: a first memory provided in a first electronic device; and a first processor provided in the first electronic device, the first processor being configured to execute first instructions stored in the first memory to control the first electronic device to: establish a first wireless connection between the first electronic device and a second electronic device; establish a second wireless connection between the first electronic device and a source device; transmit communication parameter information to the second electronic device via the first wireless connection; transmit a data request to the source device via the second wireless connection; receive a data packet transmitted by the source device in response to the data request; and transmit a first acknowledgement (ACK) signal to the second electronic device

BRIEF DESCRIPTION OF THE DRAWINGS

The above and other aspects, features and advantages will become more apparent from the following description of example embodiments, taken in conjunction with the accompanying drawings, in which.

DETAILED DESCRIPTION

Hereinafter, example embodiments will be described in detail with reference to the accompanying drawings.

Figure 1:
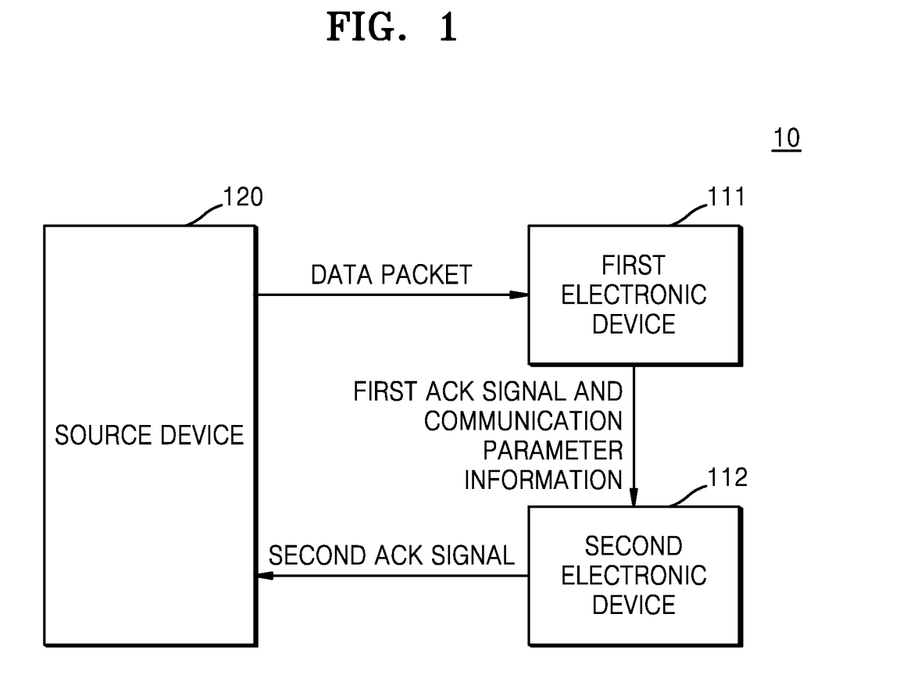
FIG. 1 illustrates a wireless communication system according to an example embodiment.

FIG. 1 illustrates a wireless communication system 10 according to an example embodiment.

Referring to FIG. 1, the wireless communication system 10 may include a first electronic device 111, a second electronic device 112, and a source device 120.

According to an example embodiment, the source device 120 may communicate with the first electronic device 111 or the second electronic device 112 in the wireless communication system 10. For example, the source device 120 may establish a wireless connection with the first electronic device 111. The first electronic device 111 may also perform a wireless connection with the second electronic device 112. The wireless connection between the first electronic device 111 and the second electronic device 112 may be different from the wireless connection between the first electronic device 111 and the source device 120. The wireless connection between the first electronic device 100 and the second electronic device 112, and the wireless connection between the first electronic device 111 and the source device 120 may both be based on short-range wireless communications including Bluetooth (BT), Bluetooth Low Energy (BLE), Wi-Fi, Zigbee, and ultra-wide band (UWB). However, example embodiments are not limited thereto.

According to an example embodiment, the source device 120 may generate a data packet and may transmit the generated data packet to the first electronic device 111. The data packet may be transmitted in response to a transmission request of the first electronic device 111. The data packet may include multimedia information. For example, when the first electronic device 111 and the second electronic device 112 are audio output devices (for example, when the first electronic device 111 is a left wireless earbud and the second electronic device 112 is a right wireless earbud), the data packet may include audio information. In another example, when the first electronic device 111 and the second electronic device 112 are image output devices, the data packet may include image information. The source device 120 may generate a data packet including the multimedia information. For example, the source device 120 may include a smartphone, a laptop computer, or a tablet PC.

According to an example embodiment, the first electronic device 111 may transmit a first acknowledgement (ACK) signal to the second electronic device 112. For example, the first electronic device 111 may transmit the first ACK signal to the second electronic device 112, wherein the first ACK signal represents that the data packet transmitted by the source device 120 is received by the first electronic device 111 and is successfully decoded. The first ACK signal may be transmitted through a communication session established between the first electronic device 111 and the second electronic device 112. The first ACK signal may be referred to as one of various terms including a partial ACK signal and a sub-ACK signal.

According to an example embodiment, the first electronic device 111 may transmit communication parameter information to the second electronic device 112 in addition to the first ACK signal. The communication parameter information may be transmitted through a communication session established between the first electronic device 111 and the second electronic device 112. The communication parameter information may include information required for the second electronic device 112 to receive the data packet and information required for the second electronic device 112 to transmit a second ACK signal to the source device 120. In this regard, the first electronic device 111 may not directly transmit the first ACK signal to the source device 120. When the second electronic device 112 does not receive the communication parameter information, the second electronic device 112 may not receive the data packet transmitted by the source device 120. This is because the source device 120 establishes the wireless connection with the first electronic device 111 and does not establish a wireless connection with the second electronic device 112. For example, when the wireless connection between the source device 120 and the first electronic device 111 is based on Bluetooth communication, the communication parameter information may include frequency hopping information and media access control (MAC) address information of the source device 120. For example, the frequency hopping information may represent a sequence (or an order) in which the first electronic device 111 and the source device 120 hop 79 Bluetooth channels. The second electronic device 112 may identify a Bluetooth channel through which the source device 120 transmits the data packet in advance based on the frequency hopping information in the communication parameter information. The second electronic device 112 may snoop the data packet through the Bluetooth channel on which the data packet is transmitted based on the communication parameter information although the wireless connection is not established with the source device 120.

According to an example embodiment, the second electronic device 112 may transmit a second ACK signal to the source device 120. The second ACK signal may be a response signal for representing that the data packet transmitted by the source device 120 is successfully received by the first electronic device 111 and the second electronic device 112. For example, the second electronic device 112 may transmit the second ACK signal to the source device 120 in response to reception of the first ACK signal from the first electronic device 111 and the data packet from the source device 120. The second ACK signal may be sent by the second electronic device 112 based on the communication parameter information. The second ACK signal may be different from the first ACK signal transmitted by the first electronic device 111 to the second electronic device 112. The second ACK signal may be referred to as one of various terms including a representative ACK signal.

Figure 2:
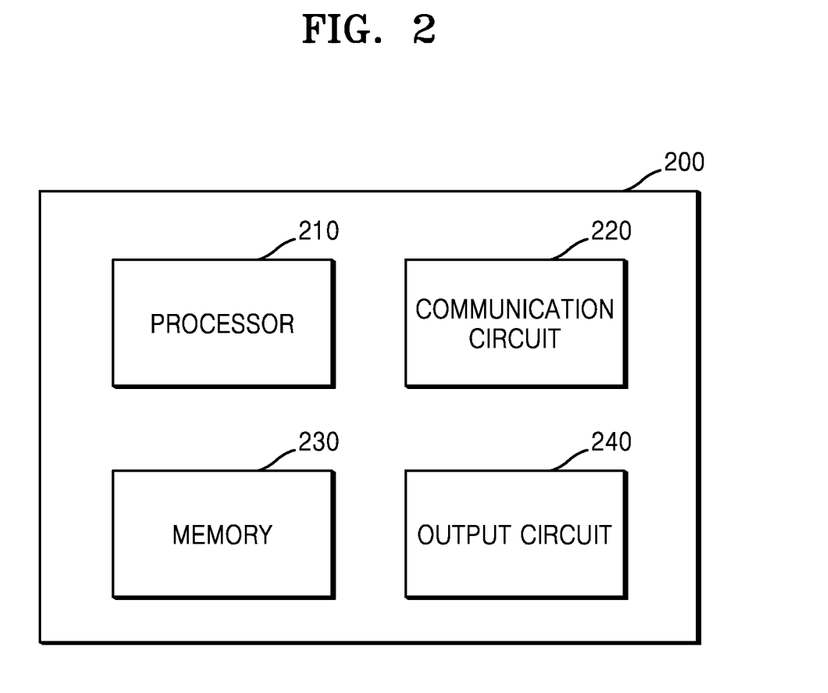
FIG. 2 is a block diagram of an electronic device according to an example embodiment.

FIG. 2 is a block diagram of an electronic device 200 according to an example embodiment.

Referring to FIG. 2, the electronic device 200 may include a processor 210, a communication circuit 220, memory 230, and an output circuit 240. The electronic device 200 may correspond to the first electronic device 111 or the second electronic device 112 illustrated in FIG. 1.

According to an example embodiment, the processor 210 may control an overall operation of the electronic device 200. For example, the processor 210 may transmit or receive a signal through the communication circuit 220. In addition, the processor 210 may record and read data in and from the memory 230. For this purpose, the processor 210 may include at least one microprocessor. The processor 210 may be referred to as a communication processor (CP).

According to an example embodiment, the communication circuit 220 may establish a wireless session with one or more external electronic devices, and may transmit and receive the signal through the wireless session. The wireless session may be based on short-range wireless communications including BT, BLE, Wi-Fi, Zigbee, and UWB. However, example embodiments are not limited thereto.

According to an example embodiment, the memory 230 may store data such as a basic program, an application program, and setting information for an operation of the electronic device 200. The memory 230 may include volatile memory, non-volatile memory, or a combination of volatile memory and non-volatile memory. In addition, the memory 230 may provide the stored data in accordance with a request of the processor 210. According to an example embodiment, the memory 230 may store the MAC address information of the source device 120 of FIG. 1 and the frequency hopping information of the wireless session established between the electronic device 200 and the source device 120.

According to an example embodiment, the output circuit 240 may perform multimedia output based on the data packet received from the source device 120 of FIG. 1. For example, when the data packet includes audio information, the output circuit 240 may correspond to a speaker for converting the audio information into an audio signal to output the audio signal. In another example, when the data packet includes image information, the output circuit 240 may include at least a display driver IC (DDI) and a panel display for visually displaying the image information.

Figure 3:
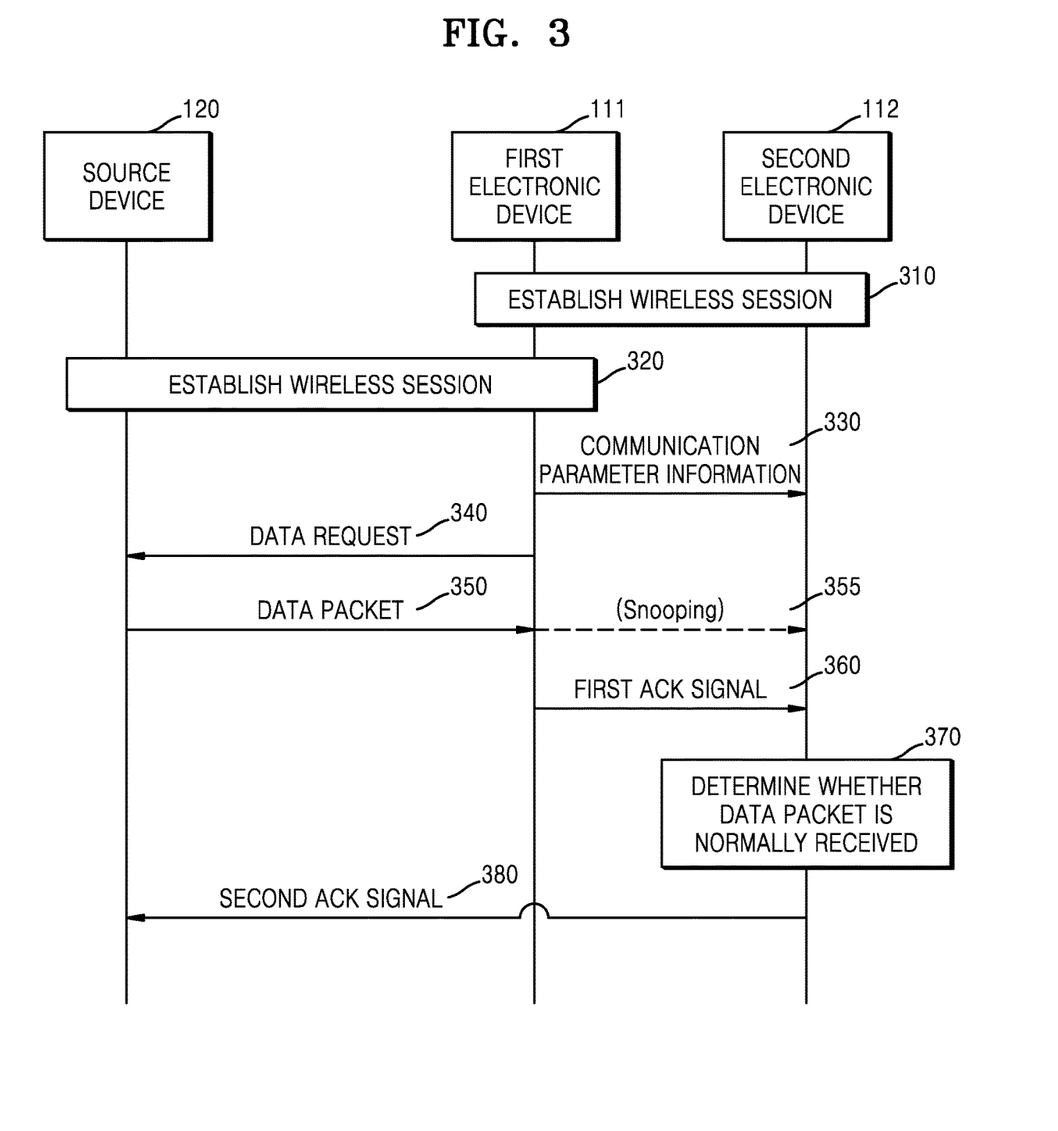
FIG. 3 is a signal exchange diagram of a wireless communication system including a first electronic device and a second electronic device according to an example embodiment.

FIG. 3 is a signal exchange diagram of a wireless communication system including a first electronic device, a second electronic device and a source device according to an example embodiment.

Referring to FIG. 3, in operation 310, the first electronic device 111 and the second electronic device 112 may establish a wireless session. The wireless session may be based on short-range wireless communications including BT, BLE, Wi-Fi, Zigbee, and UWB. The first electronic device 111 may transmit information to the second electronic device 112 through the wireless session. For example, the first electronic device 111 may transmit the communication parameter information to the second electronic device 112 through the wireless session. For example, the first electronic device 111 may transmit the first ACK signal to the second electronic device 112 through the wireless session.

In operation 320, the first electronic device 111 may establish a wireless session with the source device 120. The wireless session may be based on short-range wireless communications including BT, BLE, Wi-Fi, Zigbee, and UWB. The wireless session established by the first electronic device 111 with the source device 120 may be different from the wireless session established by the first electronic device 111 with the second electronic device 112. The first electronic device 111 may transmit or receive information to or from the source device 120 through the wireless session. For example, the first electronic device 111 may transmit a signal requesting a transmission of the data packet to the source device 120. The first electronic device 111 may receive the data packet from the source device 120.

In operation 330, the first electronic device 111 may transmit the communication parameter information to the second electronic device 112. The communication parameter information may include information items required for snooping the data packet although the second electronic device 112 does not directly establish the wireless session with the source device 120. The communication parameter information may include an identifier for identifying the source device 120. For example, the communication parameter information may include the MAC address information corresponding to the identifier. In another example, the communication parameter information may include service set identifier (SSID) information of a Wi-Fi network provided by a Wi-Fi router. The communication parameter information may include information for using the wireless session established between the source device 120 and the first electronic device 111. For example, the communication parameter information may include the frequency hopping information representing a hopping sequence of a Bluetooth connection established between the first electronic device 111 and the source device 120. According to an example embodiment, the communication parameter information may be transmitted from the first electronic device 111 to the second electronic device 112 based on a unicast or a multicast.

In operation 340, the first electronic device 111 may request data to the source device 120. For example, when the first electronic device 111 corresponds to the audio output device, the data request may be a signal requesting an audio packet. In another example, when the first electronic device 111 corresponds to the image output device, the data request may be a signal requesting an image packet. A signal by which the first electronic device 111 requests data to the source device 120 may be referred to as one of various terms including a ready signal, a streaming signal, and a play signal. According to various example embodiments, the signal requesting the data may be transmitted through the wireless session established between the first electronic device 111 and the source device 120. The signal by which the first electronic device 111 requests the data may be transmitted based on the unicast.

In operation 350, the source device 120 may transmit the data packet to the first electronic device 111. The source device 120 may generate the data packet based on the request signal received from the first electronic device 111 in operation 340 and may transmit the generated data packet to the first electronic device 111. According to various example embodiments, a signal including the data packet may be transmitted through the wireless session established between the first electronic device 111 and the source device 120. The source device 120 may use an MAC address of the identified first electronic device 111 while the wireless session is established. For example, the source device 120 may set a destination MAC address of the signal including the data packet as the MAC address of the first electronic device 111. The source device 120 may transmit the data packet while changing a frequency channel in accordance with a mutually agreed frequency hopping sequence while the wireless session is established with the first electronic device 111. The signal including the data packet may be transmitted based on the unicast.

In operation 355, the second electronic device 112 may snoop the data packet. Because the second electronic device 112 does not directly establish a wireless session with the source device 120, the data packet may not be received by the second electronic device 112. However, because the second electronic device 112 receives the communication parameter information from the first electronic device 111 in operation 330, the second electronic device 112 may identify the frequency channel through which the signal including the data packet is transmitted based on the frequency hopping information in the communication parameter information. Therefore, the MAC address of the second electronic device 112 may snoop the signal including the data packet although the MAC address of the second electronic device 112 is different from the destination MAC address of the signal including the data packet.

In operation 360, the first electronic device 111 may transmit the first ACK signal to the second electronic device 112. The first ACK signal may represent that the data packet transmitted by the source device 120 is successfully decoded. The first ACK signal may be transmitted through the communication session established between the first electronic device 111 and the second electronic device 112. The first ACK signal may be transmitted based on a unicast or a multicast.

In operation 370, the second electronic device 112 may determine whether the data packet is normally received. The second electronic device 112 may receive the first ACK signal through the first electronic device 111 in operation 360. The second electronic device 112 may identify that the first electronic device 111 successfully receives the data packet based on the first ACK signal. The second electronic device 112 may decode the data packet snooped in operation 355. When the second electronic device 112 successfully decodes the data packet and the first ACK signal has been received from the first electronic device 111, it may be determined that the data packet is normally received. In another example, when the second electronic device 112 fails to decode the data packet, it may be determined that the data packet is not normally received. In another example, when the second electronic device 112 does not receive the first ACK signal, or when a NACK signal is received from the first electronic device 111, it may be determined that the data packet is not normally received. The NACK signal may represent that the first electronic device 111 fails to decode the data packet.

In operation 380, the second electronic device 112 may transmit the second ACK signal to the source device 120. The second ACK signal may be a response signal for representing that the data packet transmitted by the source device 120 is successfully received by the first electronic device 111 and the second electronic device 112. The second electronic device 112 may set the destination MAC address as the MAC address of the source device 120 based on the MAC address information of the source device 120 in the communication parameter information received from the first electronic device 111 in operation 330 to transmit the second ACK signal. Because the source device 120 establishes the wireless session with only the first electronic device 111, the source device 120 may receive the second ACK signal and may identify that the data packet is successfully received by the first electronic device 111. The source device 120 may generate and transmit a data packet in the following order in response to the reception of the second ACK signal.

The second ACK signal may be distinguished from the first ACK signal. For example, the first ACK signal may be transmitted through the wireless session established between the first electronic device 111 and the second electronic device 112. The first ACK signal may be transmitted based on a unicast or a multicast. The second ACK signal may be transmitted based on a broadcast or a unicast.

According to the above-described example embodiments, it may be determined that the first electronic device 111 may establish the wireless session with the source device 120 to request the data packet, and the second electronic device 112 may transmit the second ACK signal for representing that the data packet is normally received. Accordingly, as the first electronic device 111 establishes the wireless session with the source device 120 to request the data packet and transmits the second ACK signal for representing that the data packet is normally received, it is possible to prevent a battery of the first electronic device 111 from being rapidly exhausted and discharged.

Figure 4:
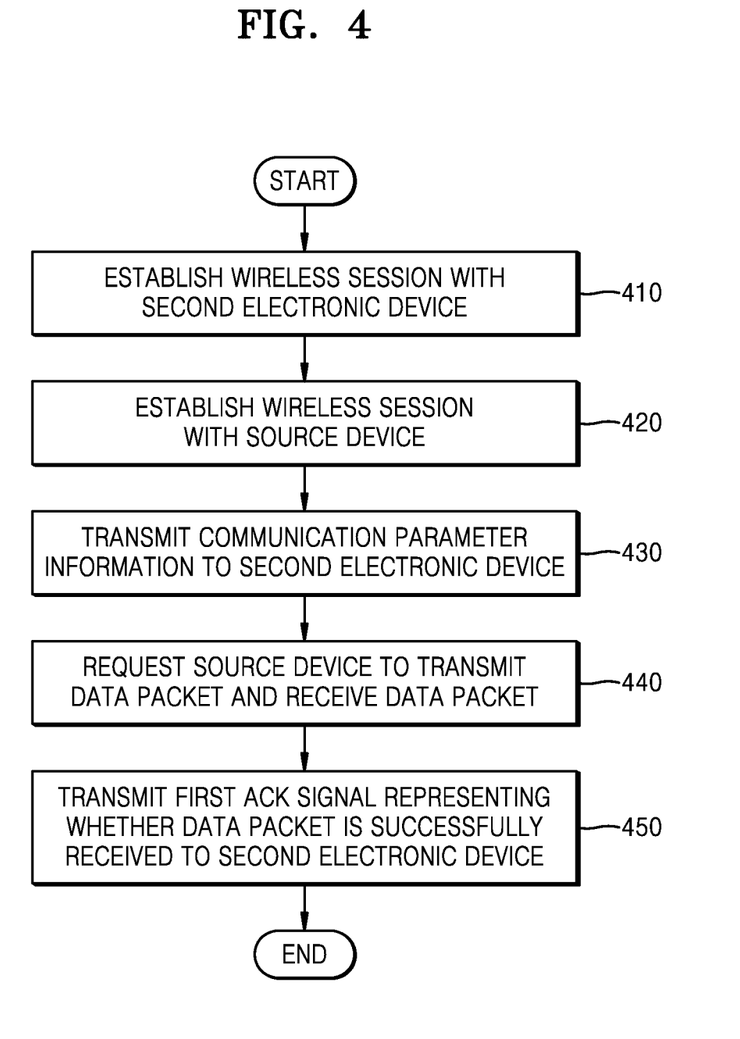
FIG. 4 is a flowchart illustrating a method of operating a first electronic device according to an example embodiment.

FIG. 4 is a flowchart illustrating a method of operating the first electronic device 111 according to an example embodiment.

Referring to FIG. 4, in operation 410, the first electronic device 111 may establish a wireless session with the second electronic device 112. The wireless session may be based on short-range wireless communications including BT, BLE, Wi-Fi, Zigbee, and UWB.

In operation 420, the first electronic device 111 may establish a wireless session with the source device 120. The wireless session may be based on short-range wireless communications including BT, BLE, Wi-Fi, Zigbee, and UWB. The first electronic device 111 may obtain an MAC address by which the source device 120 may be identified while the wireless session is established. The first electronic device 111 may obtain frequency hopping information representing a sequence of a frequency channel of a signal transmitted to and received from the source device 120 while the wireless session is established.

In operation 430, the first electronic device 111 may transmit the communication parameter information to the second electronic device 112. The communication parameter information may include information items required for the second electronic device 112 to receive the data packet and information items required for the second electronic device 112 to transmit the second ACK signal to the source device 120 instead of the first electronic device 111. For example, the first electronic device 111 may transmit the frequency hopping information, the MAC frequency information of the source device 120, and the MAC address information of the first electronic device 111, which are obtained in operation 420, to the second electronic device 112.

In operation 440, the first electronic device 111 may request the source device 120 to transmit the data packet and may receive the data packet. The first electronic device 111 may request the second electronic device 112 to transmit the data packet in response to completion of the transmission of the communication parameter information. This is because the second electronic device 112 may snoop the data packet after receiving the communication parameter information.

In operation 450, the first electronic device 111 may transmit the first ACK signal for representing whether the data packet is successfully received to the second electronic device 112. When the first electronic device 111 fails to decode the data packet, the NACK signal may be transmitted to the second electronic device 112. In another example, when the first electronic device 111 fails to decode the data packet, the transmission of the first ACK signal or the NACK signal to the second electronic device 112 may be omitted or bypassed. In this case, the second electronic device 112 may set a timer from a time when the data packet is snooped and may identify that the first electronic device 111 fails to decode the data packet when the first ACK signal is not received within a predetermined time. When the first electronic device 111 successfully decodes the data packet, the first electronic device 111 may transmit the first ACK signal representing that the data packet is successfully decoded to the second electronic device 112. The first ACK signal may be transmitted through the wireless session established between the first electronic device 111 and the second electronic device 112 based on the unicast or the multicast.

Figure 5:
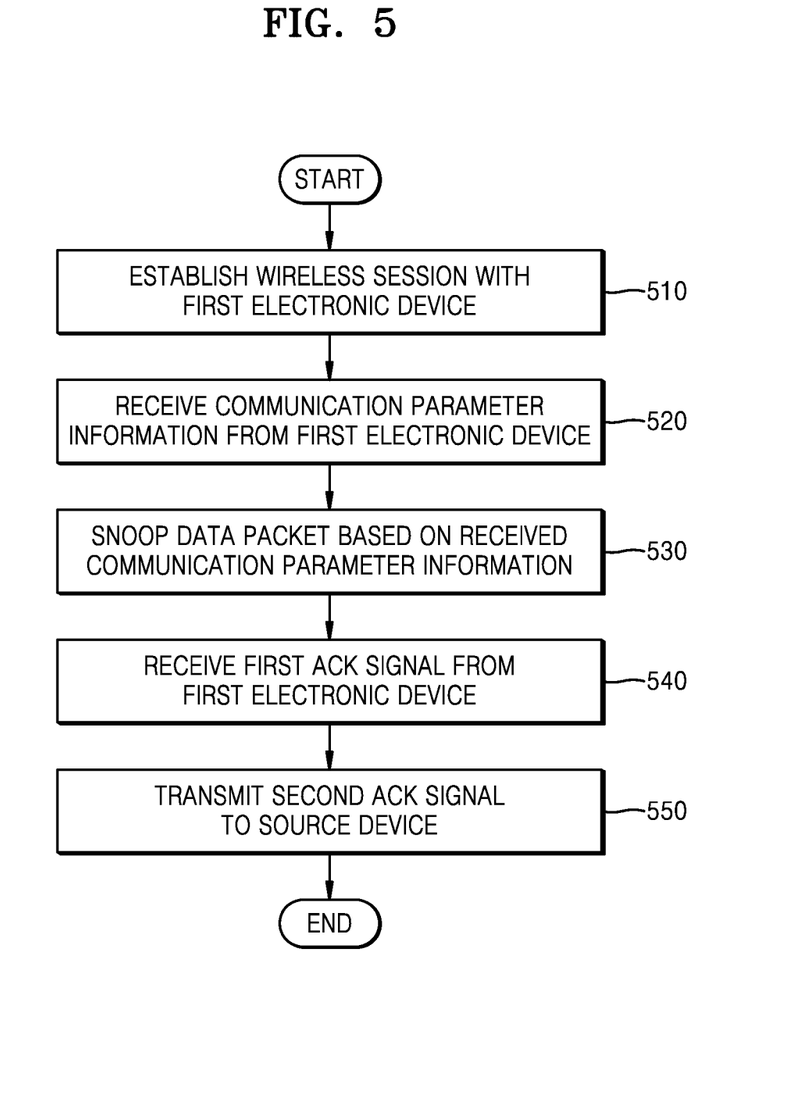
FIG. 5 is a flowchart illustrating a method of operating a second electronic device according to an example embodiment.

FIG. 5 is a flowchart illustrating a method of operating the second electronic device 112 according to an example embodiment.

Referring to FIG. 5, in operation 510, the second electronic device 112 may establish the wireless session with the first electronic device 111. The wireless session may be based on short-range wireless communications including BT, BLE, Wi-Fi, Zigbee, and UWB.

In operation 520, the second electronic device 112 may receive the communication parameter information from the first electronic device 111. The communication parameter information may include information items required for the second electronic device 112 to receive the data packet without establishing the wireless session with the source device 120 and information items required for the second electronic device 112 to transmit the second ACK signal to the source device 120 instead of the first electronic device 111. For example, the communication parameter information may include the frequency hopping information, the MAC address information of the source device 120, and the MAC address information of the first electronic device 111.

In operation 530, the second electronic device 112 may snoop the data packet based on the received communication parameter information. The second electronic device 112 may identify a change order of the frequency channel through which the data packet is transmitted to the first electronic device 111 in advance based on the frequency hopping information in the communication parameter information. The second electronic device 112 may snoop the data packet by receiving the data packet while changing the frequency channel in accordance with the hopping sequence.

In operation 540, the second electronic device 112 may receive the first ACK signal from the first electronic device 111. The first ACK signal may represent that the first electronic device 111 successfully receives the signal including the data packet and decodes the data packet.

In operation 550, the second electronic device 112 may transmit the second ACK signal to the source device 120. The second ACK signal may be transmitted when the first electronic device 111 and the second electronic device 112 successfully decode the data packet. Because the source device 120 establishes the wireless session with only the first electronic device 111, the source device 120 may determine that the first electronic device 111 successfully decodes the data packet based on the second ACK signal. Specifically, when the second electronic device 112 transmits the second ACK signal to the source device 120, the MAC address of the source device 120 included in the communication parameter information is written as an MAC address of a destination address and the MAC address of the first electronic device 111 included in the communication parameter information or obtained while establishing the wireless session with the first electronic device 111 in operation 510 may be written as a source address. The source device 120 may receive the second ACK signal and may identify the second ACK signal as being generated and transmitted by the first electronic device 111.

The second electronic device 112 may receive the first ACK signal from the first electronic device 111 and may transmit the second ACK signal in response to the successful decoding of the data packet by the second electronic device 112. The second electronic device 112 may transmit the second ACK signal by setting the MAC address of the source device 120 obtained based on the communication parameter information received from the first electronic device 111 as the destination address. The source device 120 may transmit the data packet in the following order to the first electronic device 111 in response to the reception of the second ACK signal.

Figure 6:
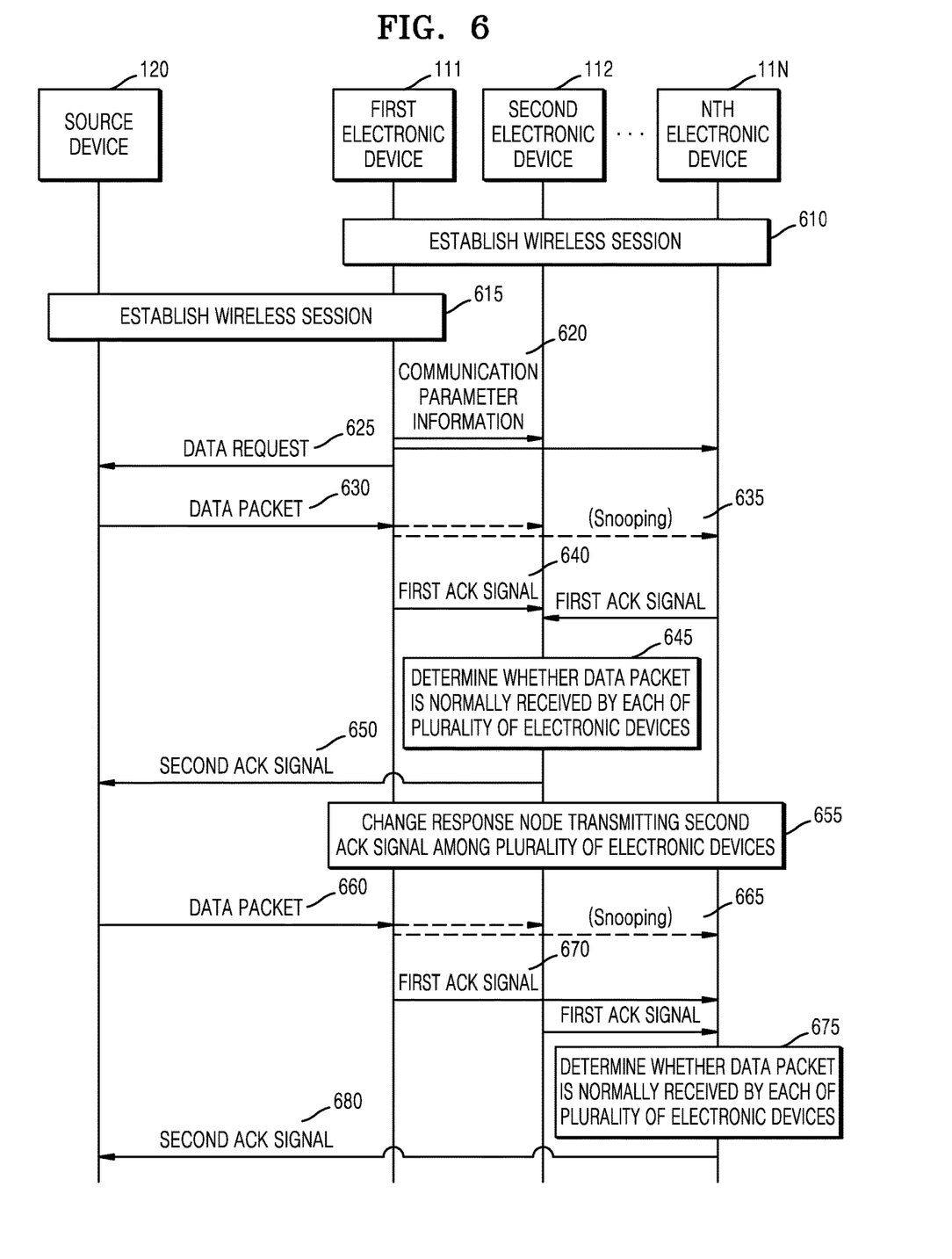
FIG. 6 is a signal exchange diagram of a wireless communication system including a plurality of electronic devices according to an example embodiment.

FIG. 6 is a signal exchange diagram of a wireless communication system 10 including a plurality of electronic devices according to an example embodiment.

Referring to FIG. 6, the wireless communication system 10 may include the plurality of electronic devices. For example, the plurality of electronic devices may correspond to first to Nth electronic devices 111 to 11N.

According to an example embodiment, the first to Nth electronic devices 111 to 11N may be same type of devices. For example, the first to Nth electronic devices 111 to 11N may be respectively audio output devices. In the case of a 5.1-channel speaker, the first electronic device 111 may correspond to a woofer and the second to Nth electronic devices 112 to 11N may respectively correspond to 5-channel speakers.

In operation 610, the first to Nth electronic devices 111 to 11N may establish a wireless session. The wireless session may be based on short-range wireless communications including BT, BLE, Wi-Fi, Zigbee, UWB, or a Bluetooth mesh. However, example embodiments are not limited thereto. The first to Nth electronic devices 111 to 11N may establish the wireless session based on one of various topologies. The various topologies may include at least, for example, a star topology in which the first electronic device 111 is connected to each of the remaining electronic devices (for example, the second to Nth electronic devices 112 to 11N), a ring topology in which each of the plurality of electronic devices is connected to electronic devices adjacent to the right and left, and a mesh topology in which the plurality of electronic devices are connected to one another.

According to an example embodiment, while the first to Nth electronic devices 111 to 11N establish the wireless session, a connection node and a response node may be determined, from among the first to Nth electronic devices 111 to 11N. The connection node may refer to one electronic device which establishes the wireless session with the source device 120 among the first to Nth electronic devices 111 to 11N. The response node may refer to one electronic device which transmits the second ACK signal to the source device 120. Hereinafter, for convenience sake, it is assumed that the connection node is initially set as the first electronic device 111 and the response node is initially set as the second electronic device 112.

In operation 615, the first electronic device 111 may establish a wireless session with the source device 120. The wireless session may be based on short-range wireless communications including BT, BLE, Wi-Fi, Zigbee, and UWB. However, example embodiments are not limited thereto. The first electronic device 111 may obtain the MAC address information of the source device 120 and the frequency hopping information corresponding to the wireless session while the wireless session is established.

In operation 620, the first electronic device 111 may transmit the communication parameter information to the second to Nth electronic devices 112 to 11N. The communication parameter information may include information required for the remaining electronic devices, except for the first electronic device 111 establishing the wireless session with the source device 120 among the plurality of electronic devices, to snoop the data packet transmitted by the source device 120. For example, the communication parameter information may include the MAC address information of the source device 120 and the frequency hopping information, which are obtained by the first electronic device 111 in operation 615.

In operation 625, the first electronic device 111 may request data to the source device 120. The signal requesting the data may be transmitted through the wireless session established between the first electronic device 111 and the source device 120. The signal by which the first electronic device 111 requests the data may be transmitted based on the unicast.

In operation 630, the source device 120 may transmit the signal including the data packet to the first electronic device 111. In response to the data request signal of operation 625, the source device 120 may generate the data packet and may transmit the signal including the generated data packet to the first electronic device 111. At this time, a destination MAC address of the signal including the data packet may coincide with the MAC address of the first electronic device 111.

In operation 635, each of the second to Nth electronic devices 112 to 11N may snoop the signal including the data packet. Because the second to Nth electronic devices 112 to 11N receive the communication parameter information from the first electron device 111, a hopping sequence of a frequency channel through which the signal including the data packet is transmitted from the source device 120 to the first electronic device 111 may be identified in advance. Therefore, the second to Nth electronic devices 112 to 11N may snoop the signal including the data packet by receiving the signal based on the hopping sequence.

In operation 640, the second electronic device 112 may receive a plurality of first ACK signals. It was described above that the second electronic device 112 was selected as the response node while establishing the wireless session in operation 610. Therefore, among the plurality of electronic devices, each of the remaining electronic devices (for example, the first electronic device 111 and the third electronic device to the Nth electronic device 11N), except for the second electronic device 112, may transmit the first ACK signal for representing that the data packet is successfully decoded to the second electronic device 112.

In operation 645, the second electronic device 112 may determine whether the data packet is normally received from each of the plurality of electronic devices. For example, when each of the remaining electronic devices, except for the second electronic device 112, among the plurality of electronic devices transmits the first ACK signal to the second electronic device 112, the second electronic device 112 may receive the first ACK signal (N−1) times. In addition, when the second electronic device 112 successfully decodes the data packet, the second electronic device 112 may determine each of the plurality of electronic devices has successfully received the data packet.

In operation 650, the second electronic device 112 may transmit the second ACK signal to the source device 120. The second electronic device 112 may transmit the second ACK signal by setting the MAC address of the source device 120 in the previously received communication parameter information as the destination address.

In operation 655, the first to Nth electronic devices 111 to 11N may change the response node for transmitting the second ACK signal among the plurality of electronic devices. For example, the response node may be changed based on a battery level of the second electronic device 112. According to various example embodiments, the change in response node may be triggered by any electronic device among the plurality of electronic devices. For example, an existing response node may monitor the battery level of the response node and the change in response node may be triggered based on the monitoring result. For example, the change may be triggered when the existing response node identifies the battery level of the response node falls below a threshold level. In another example, a connection node monitors a battery level of the connection node and the change in response node may be triggered based on the monitoring result. The change in response node will be specifically described later. Hereinafter, for convenience sake, it is assumed that the response node is changed from the second electronic device 112 to the Nth electronic device 11N.

In operations 660 and 665, the source device 120 may transmit the signal including the data packet to the first electronic device 111. Each of the second to Nth electronic devices 112 to 11N may snoop the signal including the data packet. The operations 660 and 665 may respectively correspond to the above-described operations 630 and 635.

In operation 670, each of the first electronic device 111 to the (N−1)th electronic device may transmit the first ACK signal. At this time, because the response node is changed from the second electronic device 112 to the Nth electronic device 11N in operation 655, each of the first electronic device 111 to the (N−1)th electronic device may transmit the first ACK signal to the Nth electronic device 11N.

In operation 675, the Nth electronic device 11N may determine whether the data packet is normally received from each of the plurality of electronic devices. For example, when each of the remaining electronic devices, except for the Nth electronic device 11N, among the plurality of electronic devices transmits the first ACK signal to the Nth electronic device 11N, the Nth electronic device 11N may receive the first ACK signal (N−1) times. When the Nth electronic device 11N successfully decodes the data packet, the Nth electronic device 11N may determine each of the plurality of electronic devices has successfully received the data packet.

In operation 680, the Nth electronic device 11N may transmit the second ACK signal to the source device 120. The Nth electronic device 11N, as the new response node, may transmit the second ACK signal by setting the MAC address of the source device 120 as the destination address based on the MAC address information of the source device 120 included in the previously received communication parameter information.

Figure 7:
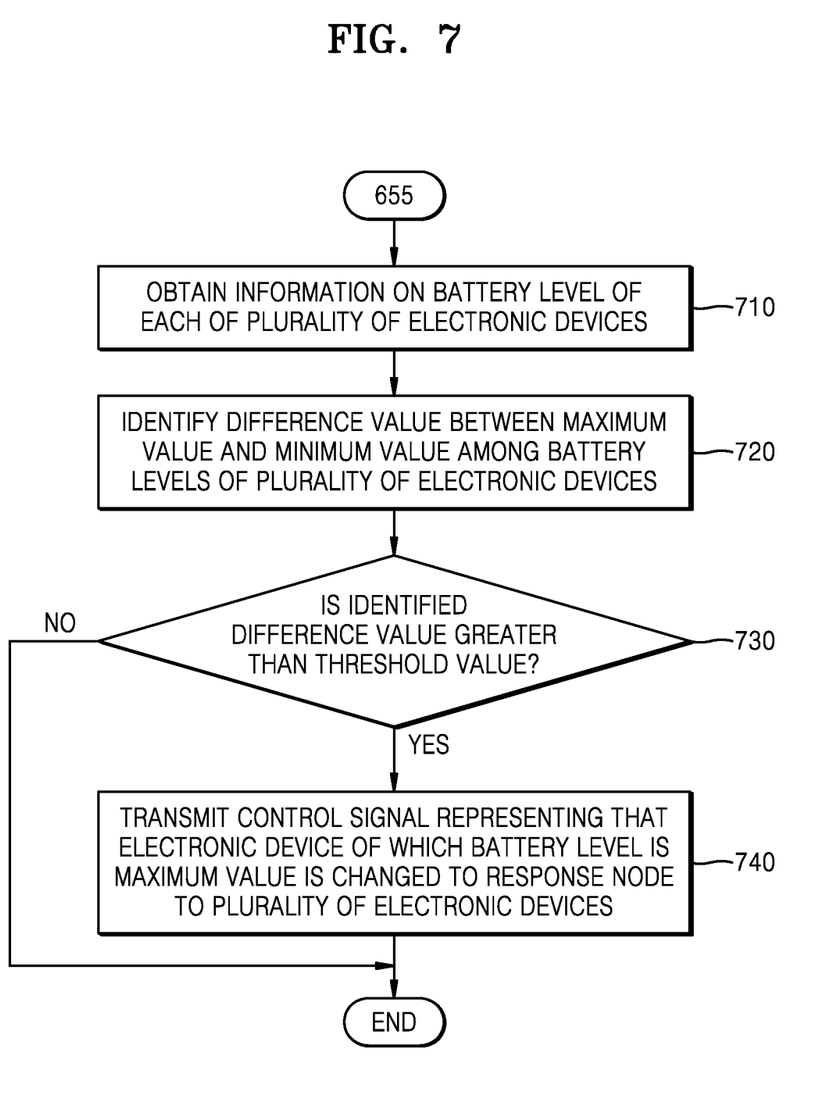
FIG. 7 is a flowchart illustrating an operation method for changing a response node according to an example embodiment.

FIG. 7 is a flowchart illustrating an operation method for changing a response node according to an example embodiment.

Referring to FIG. 7, in operation 710, the response node may obtain information indicating a battery level of each of the plurality of electronic devices. For example, the second electronic device 112 corresponding to the response node may request the remaining electronic devices (for example, the first electronic device 111 and the third electronic device to the Nth electronic device 11N), except for the second electronic device 112, among the plurality of electronic devices to transmit the information indicating the battery level at predetermined time intervals. However, example embodiments are not limited thereto and the electronic device obtaining the information indicating the battery level may be a connection node. That is, the first electronic device 111 corresponding to the connection node may request the information indicating the battery level.

In operation 720, the response node may identify a difference between the maximum value and the minimum value among the battery levels of the plurality of electronic devices. For example, when the battery level of the first electronic device 111 is 40% corresponding to the minimum value and the battery level of the Nth electronic device 11N is 90% corresponding to the maximum value, the second electronic device 112 corresponding to the response node may identify that the difference between the maximum value and the minimum value is 50%.

In operation 730, the response node may determine whether the identified difference value is greater than a threshold value. The threshold value is a predetermined value and may be variable. When the difference value is 50% and the threshold value is 30%, the second electronic device 112 corresponding to the response node may determine that the identified difference value is greater than the threshold value.

In operation 740, the response node may transmit a control signal representing that the electronic device of which battery level is the maximum value is changed to the response node to the plurality of electronic devices. For example, the second electronic device 112 corresponding to the response node may change the Nth electronic device 11N of which battery level corresponds to the maximum value to a new response node. The response node may let the plurality of electronic devices have the same battery level by setting the electronic device of which battery level is the maximum value as a new response node. The second electronic device 112 corresponding to the response node may inform the change in response node by transmitting the control signal including information representing the Nth electronic device 11N as the new response node to the plurality of electronic devices.

Figure 8:
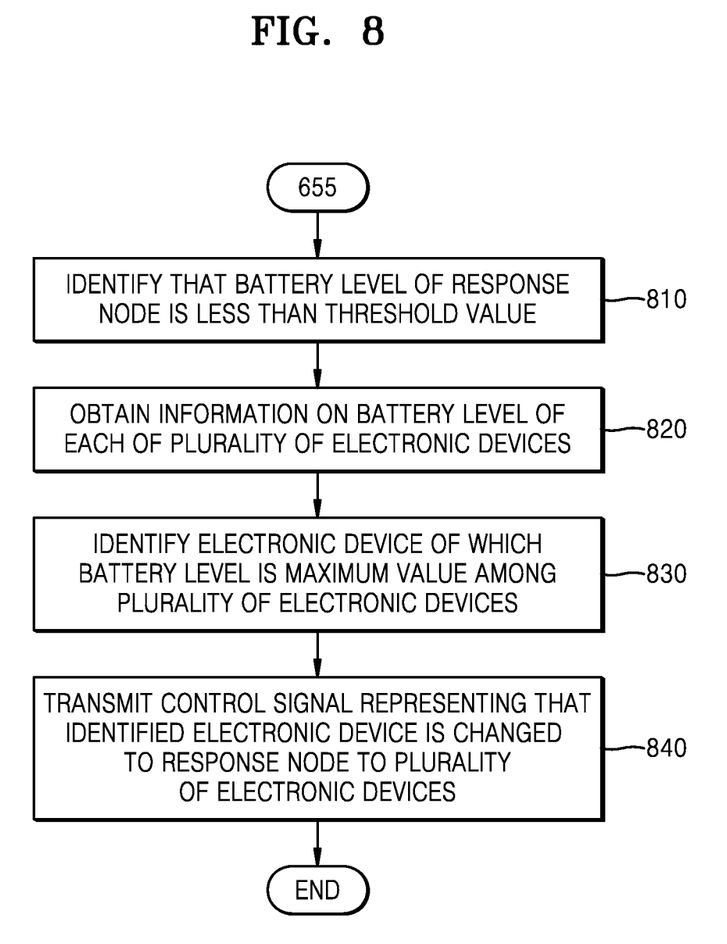
FIG. 8 is a flowchart illustrating an operation method for changing a response node according to an example embodiment.

FIG. 8 is a flowchart illustrating an operation method for changing a response node according to an example embodiment.

Referring to FIG. 8, in operation 810, it may be identified that the battery level of the response node is less than the threshold value. For example, when the response node is the second electronic device 112, the second electronic device 112 may monitor the battery level of the second electronic device 112 at predetermined time intervals. When the second electronic device 112 identifies that the monitored battery level is less than the threshold value, the change in response node may be determined for stable transmission of the second ACK signal.

In operation 820, the response node may obtain the information indicating the battery level of each of the plurality of electronic devices. The second electronic device 112 corresponding to the response node may request the information indicating the battery level of each of the plurality of electronic devices in response to the identification that the battery level of the second electronic device 112 is less than the threshold value. The second electronic device 112 may request the remaining electronic devices (for example, the first electronic device 111 and the third electronic device to the Nth electronic device 11N), except for the second electronic device 112, among the plurality of electronic devices to transmit the information indicating the battery level.

In operation 830, the response node may identify the electronic device of which battery level is the maximum value among the battery levels of the plurality of electronic devices. For example, when the battery level of the Nth electronic device 11N is 90%, which is the maximum value among the battery levels of the plurality of electronic devices, the second electronic device 112 may determine to change the Nth electronic device 11N as a new response node.

In operation 840, the response node may transmit a control signal representing that the electronic device of which battery level is the maximum value is changed to the response node to the plurality of electronic devices. For example, the second electronic device 112 corresponding to the response node may change the Nth electronic device 11N of which battery level corresponds to the maximum value to a new response node. The response node may let the plurality of electronic devices have the same battery level by setting the electronic device of which battery level is the maximum value as a new response node. The second electronic device 112 corresponding to the response node may inform the change in response node by transmitting the control signal including information representing the Nth electronic device 11N as the new response node to the plurality of electronic devices.

While aspects of example embodiments have been particularly shown and described, it will be understood that various changes in form and details may be made therein without departing from the spirit and scope of the following claims.

What is claimed is:

1. A method of transmitting an acknowledgement (ACK) signal in a wireless communication system, the method comprising:
    establishing a first wireless connection between a first electronic device, a second electronic device and a third electronic device;
    establishing, by the first electronic device, a second wireless connection between the first electronic device and a source device;
    transmitting, by the first electronic device, communication parameter information to the second electronic device and the third electronic device;
    transmitting, by the first electronic device, a data request to the source device;
    receiving, by the first electronic device, a data packet from the source device in response to the data request;
    receiving, by each of the second electronic device and the third electronic device, the data packet from the source device based on the communication parameter information;
    transmitting, by each of the first electronic device and the third electronic device, a first ACK signal to the second electronic device; and
    transmitting, by the second electronic device, a second ACK signal to the source device based on the first ACK signal being received from each of the first electronic device and the third electronic device.

2. The method of claim 1, further comprising:
    generating, by the first electronic device, the first ACK signal based on successful reception of the data packet by the first electronic device; and
    generating, by the second electronic device, the second ACK signal based on successful reception of the data packet by the second electronic device and reception of the first ACK signal by the second electronic device from each of the first electronic device and the third electronic device.

3. The method of claim 1, wherein the communication parameter information further comprises media access control (MAC) address information indicating a MAC address of the source device.

4. The method of claim 1, wherein the communication parameter information further comprises:

information required for the second electronic device to receive the data packet transmitted from the source device to the first electronic device; and information required for the second electronic device to transmit the second ACK signal to the source device on behalf of the first electronic device.

5. The method of claim 3, further comprising setting, by the second electronic device, the MAC address of the source device as a destination of the second ACK signal based on the MAC address information of the source device included in the communication parameter information.

6. The method of claim 4, further comprising receiving, by the second electronic device, the data packet based on information indicating a frequency hopping sequence in the communication parameter information.

7. The method of claim 1, wherein the first wireless connection and the second wireless connection are based on any one or any combination of Bluetooth (BT), Bluetooth Low Energy (BLE), Wi-Fi, Zigbee, and ultra-wide band (UWB).

8. A method of transmitting an acknowledgement (ACK) signal in a wireless communication system, the method comprising:

establishing a first wireless connection among a plurality of electronic devices;

establishing a second wireless connection between a first electronic device among the plurality of electronic devices and a source device;

transmitting, by the first electronic device, communication parameter information to remaining electronic devices except for the first electronic device among the plurality of electronic devices;

transmitting, by the first electronic device, a data request to the source device;

receiving, by the first electronic device, a data packet transmitted from the source device to the first electronic device based on the data request;

receiving, by the remaining electronic devices, the data packet based on the communication parameter information;

transmitting, by each of remaining electronic devices except for a second electronic device among the plurality of electronic devices, a first ACK signal to the second electronic device; and transmitting, by the second electronic device, a second ACK signal to the source device based on the first ACK signal.

9. The method of claim 8, further comprising generating, by each of the remaining electronic devices except for the second electronic device, the first ACK signal based on successful reception of the data packet; and generating the second ACK signal based on successful reception of the data packet by the second electronic device and reception of the first ACK signal by the second electronic device.

10. The method of claim 8, wherein the communication parameter information further comprises media access control (MAC) address information indicating a MAC address of the source device and information indicating a frequency hopping sequence of a wireless connection between the first electronic device and the source device.

11. The method of claim 8, wherein the first wireless connection and the second wireless connection are based on any one or any combination of Bluetooth (BT), Bluetooth Low Energy (BLE), Wi-Fi, Zigbee, and ultra-wide band (UWB).

12. The method of claim 10, wherein the receiving the data packet by the remaining electronic devices is performed based on the information indicating the frequency hopping sequence in the communication parameter information.

13. The method of claim 8, further comprising:

monitoring, by the second electronic device, a battery level of the second electronic device;

identifying, by the second electronic device, that the battery level of the second electronic device is less than a threshold value;

receiving information indicating the battery level from the remaining electronic devices except for the second electronic device; and transmitting, by the second electronic device, a control signal instructing an electronic device having a highest battery level among the remaining electronic devices, to transmit the first ACK signal to the plurality of electronic devices.

14. An electronic system comprising:

a first memory provided in a first electronic device; and a first processor provided in the first electronic device, the first processor being configured to execute first instructions stored in the first memory to control the first electronic device to:

establish a first wireless connection between the first electronic device, a second electronic device and a third electronic device;

establish a second wireless connection between the first electronic device and a source device;

transmit communication parameter information to the second electronic device via the first wireless connection;

transmit a data request to the source device via the second wireless connection;

receive a data packet transmitted by the source device in response to the data request; and transmit a first acknowledgement (ACK) signal to the second electronic device, wherein the first ACK signal represents that the data packet transmitted by the source device is received by the first electronic device.

15. The electronic system of claim 14, further comprising:

a second memory provided in the second electronic device; and a second processor provided in the second electronic device, the second processor being configured to execute second instructions stored in the second memory to control the second electronic device to:

receive the communication parameter information from the first electronic device;

receive the data packet from the source device based on the communication parameter information;

receive the first ACK signal from each of the first electronic device and the third electronic device; and transmit a second ACK signal to the source device based on the first ACK signal being received from each of the first electronic device and the third electronic device.

16. The electronic system of claim 15, further comprising:

a first wireless communication circuit that is provided in the first electronic device and is configured to establish the first wireless connection and the second wireless connection; and a second wireless communication circuit that is provided in the second electronic device and is configured to establish the first wireless connection, and transmit the second ACK signal to the source device.

17. The electronic system of claim 15, wherein the first processor is further configured to execute the first instructions to control the first electronic device to generate the first ACK signal based on successful reception of the data packet by the first electronic device, and wherein the second processor is further configured to execute the second instructions to control the second electronic device to generate the second ACK signal based on successful reception of the data packet by the second electronic device and reception of the first ACK signal by the second electronic device from each of the first electronic device and the third electronic device.

18. The electronic system of claim 15, wherein the communication parameter information further comprises media access control (MAC) address information indicating a MAC address of the source device.

19. The electronic system of claim 18, wherein the second processor is further configured to execute the second instructions to control the second electronic device to set the MAC address of the source device as a destination of the second ACK signal based on the MAC address information of the source device included in the communication parameter information.

20. The electronic system of claim 14, wherein the first wireless connection and the second wireless connection are respectively based on any one or any combination of Bluetooth (BT), Bluetooth Low Energy (BLE), Wi-Fi, Zigbee, and ultra-wide band (UWB).

* * * * *